Sept. 20, 1971  J. F. BAUMAN ET AL  3,605,189
APPARATUS FOR FORMING PLASTIC TUBING
Filed Nov. 1, 1968  2 Sheets-Sheet 1
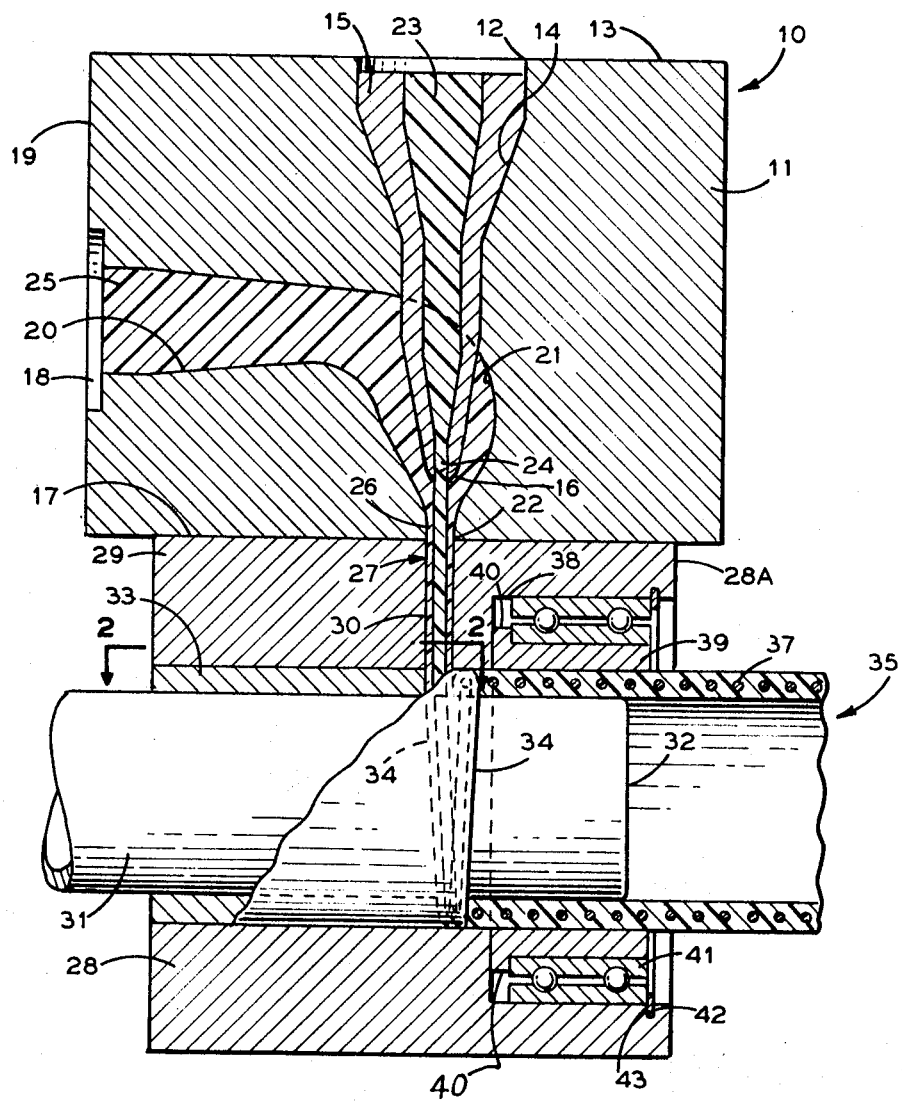
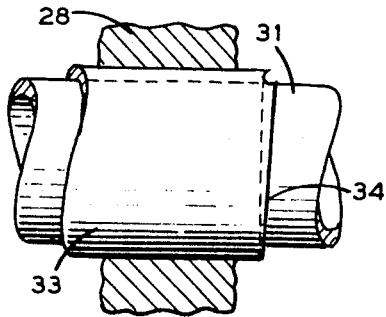
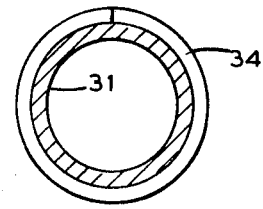
INVENTORS
Joseph F. Bauman
BY Thomas A. Caserta
Philip B. Hilbert
ATTORNEY

United States Patent Office 3,605,189
Patented Sept. 20, 1971

3,605,189
APPARATUS FOR FORMING PLASTIC TUBING
Joseph F. Bauman and Thomas A. Caserta, Trenton, N.J., assignors to Acme-Hamilton Manufacturing Corporation, Trenton, N.J.
Filed Nov. 1, 1968, Ser. No. 772,502
Int. Cl. B29d 23/05
U.S. Cl. 18—13P
11 Claims

ABSTRACT OF THE DISCLOSURE

Apparatus for forming plastic tubing from continuously extruded plastic strip which may be of a homogeneous or composite nature, wherein the strip is passed to die means to convert the same into tubular form and including improved guide means for directing the moving strip into a helical path and to bring the successive convolutions of the strip into laterally abutting relation.

BACKGROUND OF THE INVENTION

It has been proposed to form reinforced plastic tubing from an extruded composite strip of plastic material having a hard core portion and a softer covering portion; the extruded composite strip being fed into a helical path by a rotating head and thence to a pair of concentric dies where the helical convolutions of the composite strip are laterally aggregated to form the tubing having a helical reinforcement derived from the hard core portion of the composite strip.

An object of this invention is to provide improved apparatus for forming plastic tubing which may include helical reinforcing means, wherein the number of rotating parts is reduced and the construction otherwise simplified so as to minimize maintenance, improve the quality of the manufactured product and to materially reduce the cost of the apparatus and the operation thereof.

Another object of this invention is to provide an apparatus of the character described, wherein a plastic strip having a freshly extruded plastic core or a preformed core element is fed tangentially to a tube forming mandrel and is helically wound on said mandrel with the aid of a fixed guide member, to thereby minimize the manipulation of the plastic strip as it passes to the tube forming mandrel.

Other objects of this invention will in part be obvious and in part hereinafter pointed out.

BRIEF DESCRIPTION OF THE DRAWINGS

FIG. 1 is a side elevational view, with parts in section and parts broken away, of apparatus embodying the invention;

FIG. 2 is a sectional view taken on the line 2—2 of FIG. 1;

FIG. 3 is an end view showing the mandrel and guide sleeve;

DESCRIPTION OF THE PREFERRED EMBODIMENT

Figure 4:
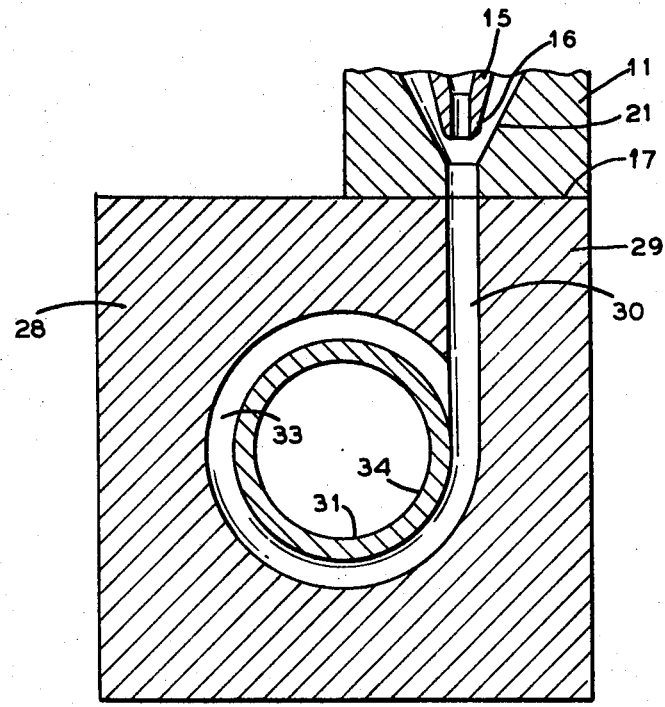
FIG. 4 is an end view in section, of the apparatus.
Figure 5:
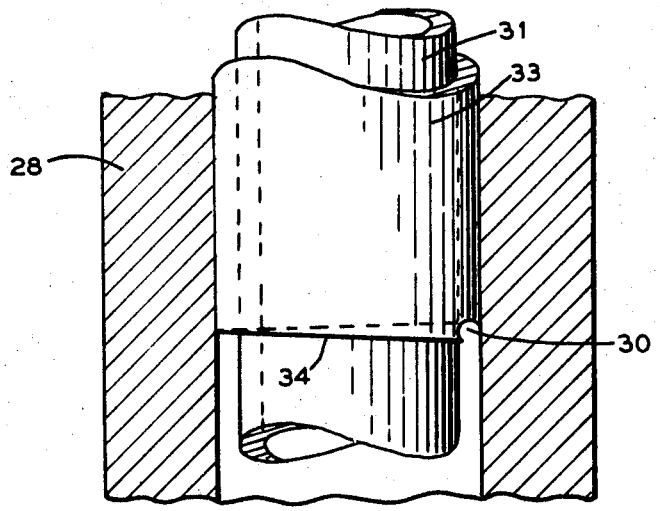
FIG. 5 is a plan view thereof, with parts in section.

Referring in detail to the drawing, 10 designates an apparatus for forming plastic tubing in accordance with the invention. The same comprises an extruder head 11 having an inlet 12 on the top surface 13 thereof, and leading to a tapering channel 14 having fixed therein a tapering nozzle member 15 which terminates in a restricted orifice 16 located adjacent the bottom surface 17 of extruder head 11.

The extruder head 11 is formed with a second inlet 18 on a side surface 19 thereof which communicates with a channel 20 extending toward channel 14 and has an extension 21 which may be concentrically related to the lower portions of nozzle member 15. Channel extension 21 terminates at its lower end in an orifice portion 22 opening on bottom surface 17 of the extruder head 11.

To form plastic tubing having a helically disposed reinforcing element therein, plastic material 23 is supplied by the extruder, not shown, with which head 11 is associated. Plastic material 23 is of a selected hardness in its final form and may have other selected mechanical and/or chemical properties. Material 23 entering at inlet 12 passes through nozzle member 15 and is converted to rodlike form 24 at orifice 16.

While rodlike element 24 is being formed, other plastic 25 is supplied to inlet 18, passing through channel 20, extension 21 and orifice 22 to enclose rodlike element 24 within a covering 26. The composite strip 27 made up of core element 24 and covering 26 issues from orifice 22. The plastic of covering 26 may be somewhate softer than plastic 23 and is otherwise selected in terms of desired mechanical and chemical properties.

The extruder 11 has associated therewith tube forming means including a bored member 28 abutting the bottom surface 17 thereof; the wall portion 29 thereof being formed with a passage 30 which communicates at its upper end with orifice 22 in head 11.

A mandrel 31 is rotatably mounted in tubular member 28 being supported on bearings not shown, and rotated by suitable means, not shown. The forward end 32 of mandrel 31 is located somewhat inwardly of the forward edge 28A of tubular member 28. A guide sleeve 33 is fixedly positioned within tubular member 28; the outer surface of mandrel 31 being in rotatable contact with the inner surface of said guide sleeve 33.

Guide sleeve 33 has its forward edge 34 helically shaped in a single complete convolution. The lower end of passage 30 in tubular member 28 extends to a starting portion of helical guide edge 34. It will be apparent that as composite strip 27 moves downwardly through passage 30, the same is guided in a helical path about rotating mandrel 31. The successive convolutions of strip 27 as they are advanced forwardly over rotating mandrel, will be laterally aggregated in their somewhat soft plastic condition, to thereby form continuously extending tubing 35 with a helical reinforcement 37 derived from core 24.

To facilitate the formation of tubing 35, tubular member 28 is formed with an annular recess 38 on the inner surface thereof and at the forward end thereof. A rotatable annular member 39 having a radial flange 40 at the rear end thereof is mounted in recess 38 on annular bearing 41 which captures flange 40 to prevent longitudinal movement of member 39. A snap ring 42 fitted into annular groove 43 in recessed surface 38 retains the bearing 41 against movement outwardly of recess 38.

The inner surface of annular member 39 is substantially coextensive with the inner surface of member 28. The member 39 rotates freely, and together with mandrel 31 serves to advance the freshly formed tubing 35. Suitable means, not shown, is used to take up the freshly formed tubing 35 with a selected draw-off tension.

As the plastic materials 23, 25 are in an initially hot state; suitable cooling means may be provided as by making mandrel 31 hollow and providing the same with a circulating cooling medium. Member 28 may be similarly provided with suitable cooling passages, not shown.

It is understood that in lieu of the freshly extruded core 24, a preformed solid core of selected plastic, metal or other suitable materials may be used; such preformed core being introduced by way of nozzle member 15 and being enclosed in covering 26; the resultant composite being formed into tubing 35, as above described.

The core element 24 may have any desired cross section, as dictated by the cross section of orifice 16 of nozzle member 15. Also, the orifice 16 may be so positioned as to locate its axis in offset relation to the axis of orifice 22; in which case, the reinforcement 37 may have varied positions within the wall of tubing 35.

We claim:

1. Apparatus for forming plastic tubing comprising a rotatable mandrel, tubular die means concentrically related to said mandrel to form an annular passage therebetween, means for feeding reinforced plastic strip material toward said annular passage, and fixed means for guiding said moving strip in a helical path into said annular passage between said die means and said mandrel, said reinforced plastic strip material comprising a rod-like central core of a first material surrounded by a second plastic material softer than said first material.

2. Apparatus as in claim 1 wherein said feeding means comrises an extruder head formed with a pair of channels for respectively receiving plastic material, said channels having discharge nozzle portions in concentric relation to form a continuous composite strip including a core portion extruded by the discharge nozzle portion of the innermost channel and a covering portion for said core portion extruded by the discharge nozzle portion of the outermost channel.

3. Apparatus as in claim 2, wherein said tubular die means includes a wall portion thereof formed with a passage for passing said composite strip to the guide means.

4. Apparatus as in claim 3, and further including an annular member rotatably mounted on the forward end of said tubular die member, opposed surface portions of said annular member and said mandrel forming an annular passage communicating with said first mentioned annular passage.

5. Apparatus as in claim 1 wherein said feeding means comprises an extruder head formed with inlet and discharge means, said tubular die means being formed with a passage communicating at one end thereof with said discharge means, said guide means comprising a sleeve member disposed between said die means and said mandrel, said sleeve having a leading spiral guide edge, the other end of said passage extending to a portion of the spiral guide edge of said sleeve member.

6. Apparatus as in claim 1 wherein said feeding means includes means for feeding a core element, and means for enclosing said core element in a plastic covering to form said strip material.

7. Apparatus as in claim 1 wherein said tubular die means includes a passage communicating at one end thereof with said feeding means, the other end of said passage being tangentially related to and communicating with the annular passage between said die means and said mandrel.

8. Apparatus for forming plastic tubing comprising:
die means having a tubular shaped opening;
a cylindrical shaped mandrel positioned in said opening;
said die means including means having an inclined edge adjacent to and surrounding said mandrel at a location intermediate the ends of the mandrel;
a guide channel being provided in said die means having a first opening along one surface of said die member and a second opening immediately adjacent said inclined edge surface;
means for feeding plastic material into said first opening whereby said plastic material passes through said channel and is emitted from said second opening as a continuous plastic strip whose shape is defined by the shape of said second opening;
said plastic strip being guided by said inclined edge surface in a first direction to form a helical pattern surrounding said mandrel whereby adjacent edges of said plastic strip abut one another to form a continuous plastic tube.

9. The apparatus of claim 8 wherein a first end of said mandrel extends a predetermined distance beyond said inclined edge surface in the first direction to form a tubular shaped channel for guiding the helically formed strip out of a first end of said die member tubular opening.

10. Apparatus as set forth in claim 9 wherein said feeding means comprises an extruder head formed with a pair of channels having discharge nozzle portions arranged in concentric fashion to form a continuous composite strip including a core portion emitted from the discharge nozzle portion of the inner channel and a covering portion emitted by the discharge nozzle portion of the outer channel;
the outlet of said concentric nozzle portions communicating with the first opening of said guide channel.

11. Apparatus for forming plastic tubing comprising a rotatable mandrel;
tubular die means concentrically related to said mandrel to form an annular passage therebetween;
means for feeding plastic strip material toward said annular passage, and fixed means for guiding said moving strip in a helical path into said annular passage between said die means and said mandrel;
said guide means comprising a sleeve member disposed between said die means and said mandrel, said sleeve having a leading spiral guide edge engaging said material for urging said material into said helical path.

References Cited

UNITED STATES PATENTS

| 3,376,605 | 4/1968 | Beattie | 18—13(R)X |
| 3,416,982 | 12/1968 | Petzetakis | 18—13(R)X |

WILLIAM S. LAWSON, Primary Examiner

U.S. Cl. X.R.

18—14RR, 14T; 264—173